J. C. R. PALMER & F. J. HOLMES.
ELECTROMAGNETIC DEVICE.
APPLICATION FILED JUNE 8, 1915.

1,230,429. Patented June 19, 1917.

Witnesses:
O. B. M. Guthe,
D. E. Raemmus

Inventors:
Joel C. R. Palmer.
Frank J. Holmes.
by  Atty.

UNITED STATES PATENT OFFICE.

JOEL C. R. PALMER, OF NEW ROCHELLE, AND FRANK J. HOLMES, OF NEW YORK, N. Y., ASSIGNORS, BY MESNE ASSIGNMENTS, TO WESTERN ELECTRIC COMPANY, INCORPORATED, A CORPORATION OF NEW YORK.

ELECTROMAGNETIC DEVICE.

1,230,429.      Specification of Letters Patent.     Patented June 19, 1917.

Application filed June 8, 1915. Serial No. 32,845.

*To all whom it may concern:*

Be it known that we, JOEL C. R. PALMER and FRANK J. HOLMES, citizens of the United States, residing at New Rochelle, in the county of Westchester and State of New York, and at New York, in the county of New York and State of New York, respectively, have invented certain new and useful Improvements in Electromagnetic Devices, of which the following is a full, clear, concise, and exact description.

This invention relates to electromagnetic devices, and more particularly to a polarized magnetic structure suitable for polarizing relays, telephone receivers and the like, and its object is to increase the sensitiveness of such a device.

This invention provides a magnet which may be either a permanent magnet or an electromagnet, each pole of which is provided with two polar extensions forming in effect two sets of north and south poles. An armature is mounted intermediate said poles so as to be capable of movement toward one set of north and south poles or toward the other set of north and south poles, depending upon which set of poles is momentarily the stronger. The poles of the magnet are equipped with inductive windings through which currents of reversing polarity may be sent, whereby a preponderance of flux is shifted to one set of north and south poles or the other set, depending upon the momentary polarity of said current. The invention further provides a path of low reluctance between the two polar extensions of like polarity for aiding a quick transfer of flux from one set of polar extensions to the other.

Figure 1:
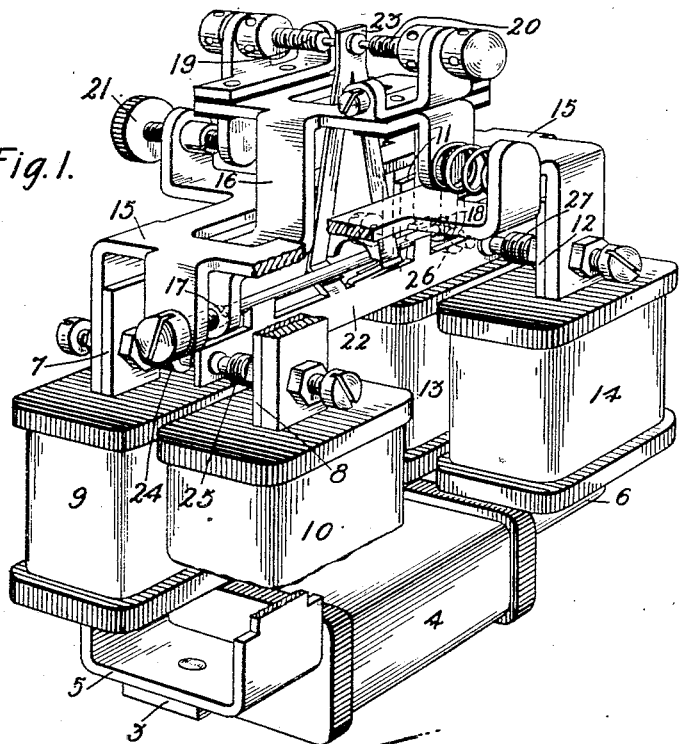
Figure 2:
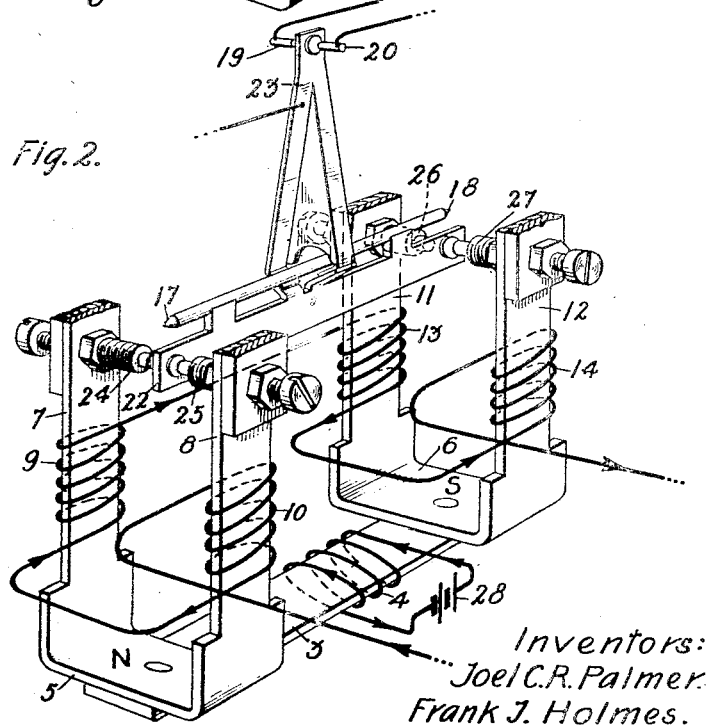

For a more complete understanding of the invention, reference may be had to the accompanying drawing in which Figure 1 represents in perspective view a polarized telegraph relay employing the principle of this invention, and Fig. 2 illustrates in skeleton form the magnetic structure employed.

In the drawing, 3 is a magnetic core equipped with a magnetizing winding 4. U-shaped magnetic polar extensions 5 and 6 are riveted, welded or attached in any other suitable manner to the opposite poles of core 3. The two poles 7 and 8 of polar extension 5 are equipped with the electromagnetic spools 9 and 10, respectively. Similarly, poles 11 and 12 of polar extension 6 are equipped with spools 13 and 14 respectively. Supported by poles 7, 8, 11 and 12 is a frame-work 15 of brass or other non-magnetic material. An auxiliary frame-work 16 is pivotally supported at 17 and 18 by frame-work 15. The upper part of frame 16 carries the two adjustable contact points 19 and 20 which are insulated from said frame-work. The whole frame-work 16 is capable of lateral displacement or adjustment by means of screw 21, without changing the relative adjustment of the points 19 and 20. An armature 22 is also pivotally supported at 17 and 18 and adapted to move toward poles 7 and 11 and away from poles 8 and 12, or vice versa. Attached to armature 22 is a light contact arm 23, the upper end of which plays between the contact points 19 and 20. Iron screws 24, 25, 26 and 27 are provided to decrease the reluctance of the magnetic paths between the armature 22 and the poles 7, 8, 11 and 12 respectively, and serve as adjustable pole pieces therefor.

In operation, the core 3 is magnetized by direct current supplied from a source 28 through the windings of coil 4 or, if desired, a permanent magnet may be substituted for the core 3. It will thus be seen that the poles 7 and 8 will be of like polarity and equal strength, and that poles 11 and 12 will be of a polarity opposite to that of 7 and 8. If the flow of current through winding 4 be in the direction indicated by the arrows, poles 7 and 8 will be of north polarity and poles 11 and 12 of south polarity, and the lines of magnetic force passing through the armature 22 will thus tend to divide equally between the two poles 7 and 8 at one end and the poles 11 and 12 at the other, there being no magnetic unbalance present. If now, the windings 9, 10, 13 and 14 be connected as shown in Fig. 2, and a current sent therethrough in the direction indicated by the arrows, the poles 7 and 11 will be strengthened and the poles 8 and 12 will be weakened with the result that a preponderance of flux will be shifted to poles 7 and 11 and the armature 22 will be drawn toward said poles. If the direction of current in the operating windings 9, 10, 13 and 14 be reversed, the armature will similarly be drawn toward poles 8 and 12, and if said current be an alternating one, the armature will vibrate from one set of north and south poles to the other, in accordance with the current alternations. Due to the fact that the magnetic path between poles 7 and 8 and also between poles 11 and 12 is short and of low reluctance, the shifting of flux above mentioned will respond to current reversals of extreme rapidity in the operating windings and a polarized structure is therefore provided which is well adapted to use in a high speed telegraph relay or to other uses requiring a quick directional response to succeeding impulses of different polarities.

What is claimed is:

1. An electromagnetic device comprising a magnet having two north and two south polar extensions forming two sets of north and south poles, and an armature having one end extending between said north polar extensions and the other end extending between said south polar extensions and adapted to move toward one set of north and south poles or toward the other set of north or south poles.

2. An electromagnetic device comprising a magnet having two north and two south polar extensions forming two sets of north and south poles, an armature having one end extending between said north polar extensions and the other end extending between said south polar extensions and adapted to move toward one set of north and south poles or toward the other set of north and south poles, and a path of low magnetic reluctance between said polar extensions of like polarity.

3. An electromagnetic device comprising a magnet having two north and two south polar extensions forming two sets of north and south poles, an armature mounted intermediate said two sets of poles, and windings on said polar extensions for shifting a preponderance of flux to one of said sets of north and south poles.

4. An electromagnetic device comprising a magnet having two north and two south poles forming two sets of north and south poles, a pivoted armature intermediate said poles and adapted to move toward one set of north and south poles or toward the other set of north and south poles, and windings on said poles for simultaneously strengthening one of said sets of north and south poles and weakening the other set of north and south poles.

5. An electromagnetic device comprising a magnet, a U-shaped polar extension on each pole of said magnet, a winding on each limb of each of said polar extensions, and an armature extending between said limbs of like polarity and pivotally mounted to move between said limbs in a direction transverse to the field of said magnet.

6. An electromagnetic device comprising a magnet, a U-shaped polar extension on each pole thereof, forming two sets of north and south poles, a winding on each limb of each of said polar extensions whereby a preponderance of flux may be shifted to one or the other set of north and south poles, and an armature pivotally mounted to follow said shifting of flux.

In witness whereof, we hereunto subscribe our names this 4th day of June, A. D. 1915.

JOEL C. R. PALMER.
FRANK J. HOLMES.